United States Patent
Ozersky et al.

(10) Patent No.: US 12,258,294 B2
(45) Date of Patent: Mar. 25, 2025

(54) CEMENT AND PROCESS FOR PRODUCING SELF-PROTECTING CEMENT

(71) Applicant: MACROCEMENT INDUSTRIES LTD., Toronto (CA)

(72) Inventors: Alexander Ozersky, Richmond Hill (CA); Alexander Khomyakov, Vaughan (CA)

(73) Assignee: MACROCEMENT INDUSTRIES LTD., Toronto (CA)

( * ) Notice: Subject to any disclaimer, the term of this patent is extended or adjusted under 35 U.S.C. 154(b) by 713 days.

(21) Appl. No.: 17/043,443

(22) PCT Filed: Oct. 7, 2019

(86) PCT No.: PCT/CA2019/051430
§ 371 (c)(1),
(2) Date: Sep. 29, 2020

(87) PCT Pub. No.: WO2020/073119
PCT Pub. Date: Apr. 16, 2020

(65) Prior Publication Data
US 2021/0363058 A1    Nov. 25, 2021

Related U.S. Application Data

(60) Provisional application No. 62/770,303, filed on Nov. 21, 2018, provisional application No. 62/743,796, filed on Oct. 10, 2018.

(51) Int. Cl.
*C04B 20/10* (2006.01)
*C04B 16/04* (2006.01)
*C04B 28/04* (2006.01)

(52) U.S. Cl.
CPC .......... *C04B 20/1029* (2013.01); *C04B 16/04* (2013.01); *C04B 28/04* (2013.01)

(58) Field of Classification Search
CPC ..... C04B 20/1029; C04B 16/04; C04B 28/04; C04B 24/008; C04B 7/52; C04B 20/1022; C04B 20/1025
(Continued)

(56) References Cited

U.S. PATENT DOCUMENTS 2,996,394 A    8/1961   Stoll
10,131,580 B2 * 11/2018 Gehrig ................. D21H 17/28
(Continued)

FOREIGN PATENT DOCUMENTS

| CN | 107473676 A | 12/2017 |
| WO | 1999028264 A1 | 6/1999 |
| WO | 2016062866 A1 | 4/2016 |

OTHER PUBLICATIONS

Civil Today: Hydraulic Cement—Definition—Composition—When to Use; Hasan [online], [retrieved on Jul. 29, 2023]. Retrieved from the internet: < URL: https://civiltoday.com/civil-engineering-materials/cement/hydraulic-cement/101-what-is-hydraulic-cement-history-composition-use-procedure> (Year: 2023).*

(Continued)

*Primary Examiner* — Colin W. Slifka
*Assistant Examiner* — Ritu S Shirali
(74) *Attorney, Agent, or Firm* — Bhole IP Law; Marc Lampert; Anil Bhole

(57) ABSTRACT

A process for producing cement includes combining a cement precursor and a wax, wherein the wax includes alkyl ketene dimer wax and/or alkenyl ketene dimer wax, grinding the cement precursor and the wax to yield cement grains coated with the wax. A cement includes cement powder grains and a coating of wax on the Portland cement powder grains, wherein the wax includes alkyl ketene dimer wax and/or alkenyl ketene dimer wax. A process for making cementitious material includes combining a cement with (Continued)

water to yield a slurry, wherein the cement includes cement powder grains and a coating of wax on the cement powder grains, wherein the wax includes alkyl ketene dimer wax and/or alkenyl ketene dimer wax, and allowing the slurry to set.

4 Claims, 7 Drawing Sheets

(58) Field of Classification Search
USPC .......................................................... 106/660
See application file for complete search history.

(56) References Cited

U.S. PATENT DOCUMENTS

| 2013/0005864 | A1 | 1/2013 | Baumann |
| 2015/0119490 | A1 | 4/2015 | Krishnan et al. |
| 2017/0240467 | A1 | 8/2017 | Gehrig et al. |
| 2017/0240468 | A1 | 8/2017 | Gehrig et al. |

OTHER PUBLICATIONS

Schumacher et al., Coal utilization in the cement and concrete industries, 2013, The Coal Handbook: Towards Cleaner Production: Coal Utilisation, vol. 2 in Woodhead Publishing Series in Energy, 15.3.1 'Make-up of Portland cement' (Year: 2013).*

Christensen et al., Preparation of redispersible dry emulsions by spray drying, 2001, International Journal of Pharmaceuticals 212, 187-194 (Year: 2001).*

Wikipedia:About [online], [capture from May 14, 2012]. Retrieved from the Internet < URL: http://en.wikipedia.org/wiki/Wikipedia:About> (Year: 2012).*

First Office Action for Chinese application No. 201980027214.9, Chinese Patent Office, issued: Feb. 25, 2022.

Office Action for Indian application No. 202017043567, Indian Patent Office, issued: Nov. 1, 2022.

Second Office Action for Chinese application No. 201980027214.9, Chinese Patent Office, issued: Dec. 14, 2022.

Substantive Examination Report Stage 1 for Indonesian application No. P00202102448, Patent Office of Indonesia, dated: Apr. 10, 2023.

Third Office Action for Chinese patent application No. 201980027214.9, Chinese Patent Office, issued: May 24, 2023.

Office Action for Chinese application No. 201980027214.9, China National Intellectual Property Administration, issue date: Sep. 18, 2023.

Office Action for Vietnamese application No. 1-2021-01701, Intellectual Property Office of Vietnam, dated: Aug. 14, 2023.

International Search Report for PCT/CA2019/051430, Canadian Intellectual Property Office, issued Dec. 13, 2019.

Written Opinion for PCT/CA2019/051430, Canadian Intellectual Property Office, issued Dec. 13, 2019.

Examination Report for Canadian application No. 3,096,412, CIPO, dated: Feb. 6, 2024.

* cited by examiner

CEMENT AND PROCESS FOR PRODUCING SELF-PROTECTING CEMENT

FIELD

This document relates to cement. More specifically, this document relates to processes for producing self-protecting cement, processes for using self-protecting cement to make cementitious materials, and self-protecting cement itself.

BACKGROUND

USSR Patent Application Publication No. SU 84554 (Khigerovich et al.) discloses providing hydrophobicity to cement by the introduction of oleic acid into a cement mill during clinker grinding, in an amount of about 0.1% with respect to the mass of the cement.

U.S. Pat. No. 2,996,394 (Stoll) discloses a hydrophobic, non-caking cement product adapted for protracted storage in high humidity areas, consisting of Portland cement, 0.1 to 0.4 percent of oleic acid, and 0.04 to 0.20 percent of tri-n-butyl phosphate.

International Patent Application Publication No. WO2018157239A1 (Ozersky et al.) discloses a macro-cement and associated methods useful for preparing pastes, mortars, concretes and other cement-based materials having high workability, high density, and high strength. A method of producing a macro-cement includes cement, supplemental cementitious materials (SCM's), including siliceous sub-micron-sized particles and nano-sized particles, and polymers in the form of liquid or dry chemical admixtures for concrete. The cement mixture may be used for making ultra-high performance concrete (UHPC). The macro-cement can be produced in the form of granules, pellets, briquettes or tablets by mechanical activation during the process of coating and/or loading of the cementitious materials.

SUMMARY

The following summary is intended to introduce the reader to various aspects of the detailed description, but not to define or delimit any invention.

A process for producing self-protecting cement is disclosed. According to some aspects, the process includes combining a cement precursor and a wax, wherein the wax includes alkyl ketene dimer wax and/or alkenyl ketene dimer wax, and grinding the cement precursor and the wax to yield cement grains coated with the wax.

In some examples, the cement precursor is a Portland cement precursor. In some examples, the Portland cement precursor includes cement clinker.

In some examples, the wax is alkyl ketene dimer wax. The alkyl ketene dimer wax can be provided in the form of pellets (also known as flakes or prills), and the method can further include melting the pellets during step b.

In some examples, in step a., the cement precursor and the wax are combined in a ratio of between 995:5 and 999.5:0.5 by mass. In some examples, in step a., the cement precursor and the wax are combined in a ratio of about 999:1 by mass.

In some examples, step a. is carried out prior to step b. In some examples, step a. is carried out concurrently with step b.

In some examples, step b. includes grinding the cement precursor and the wax in a cement mill. In some examples, step b. includes grinding the cement clinker and the wax in a ball mill or a roller mill or an attritor. In some examples, step b includes heating the mixture of cement and AKD wax above melting point of the AKD during intensive mixing.

In some examples, the wax further includes paraffin.

A self-protecting cement is also disclosed. According to some aspects, the self-protecting cement includes cement powder grains, and a coating of wax on the cement powder grains, wherein the wax comprises alkyl ketene dimer wax and/or alkenyl ketene dimer wax.

In some examples, the cement powder grains are Portland cement powder grains.

In some examples, the coating is discontinuous on the cement powder grains. In some examples, the coating is continuous on the cement powder grains.

In some examples, the cement powder comprises between 99.0 mass % and 99.95 mass % cement powder grains, and between 1.0 mass % and 0.05 mass % wax.

In some examples, the wax further includes paraffin.

A process for making a cementitious material is also disclosed. According to some aspects, the process includes combining a self-protecting cement with water to yield a slurry, wherein the self-protecting cement includes cement powder grains and a coating of wax on the cement powder grains, and wherein the wax comprises alkyl ketene dimer wax and/or alkenyl ketene dimer wax, and allowing the slurry to set.

In some examples, the cement powder grains are Portland cement powder grains.

In some examples, the coating is discontinuous on the cement powder grains. In some examples, the coating is continuous on the cement powder grains.

In some examples, the cement powder includes between 1.0 mass % and 0.05 mass % wax, and between 99.0 mass % and 99.95 mass % Portland cement powder grains.

In some examples, the wax further includes paraffin.

BRIEF DESCRIPTION OF THE DRAWINGS

The drawings included herewith are for illustrating various examples of the subject matter of the present specification and are not intended to limit the scope of what is taught in any way. In the drawings:

FIG. 2B is an enlarged view of a portion of FIG. 2A;

DETAILED DESCRIPTION

Figure 1:
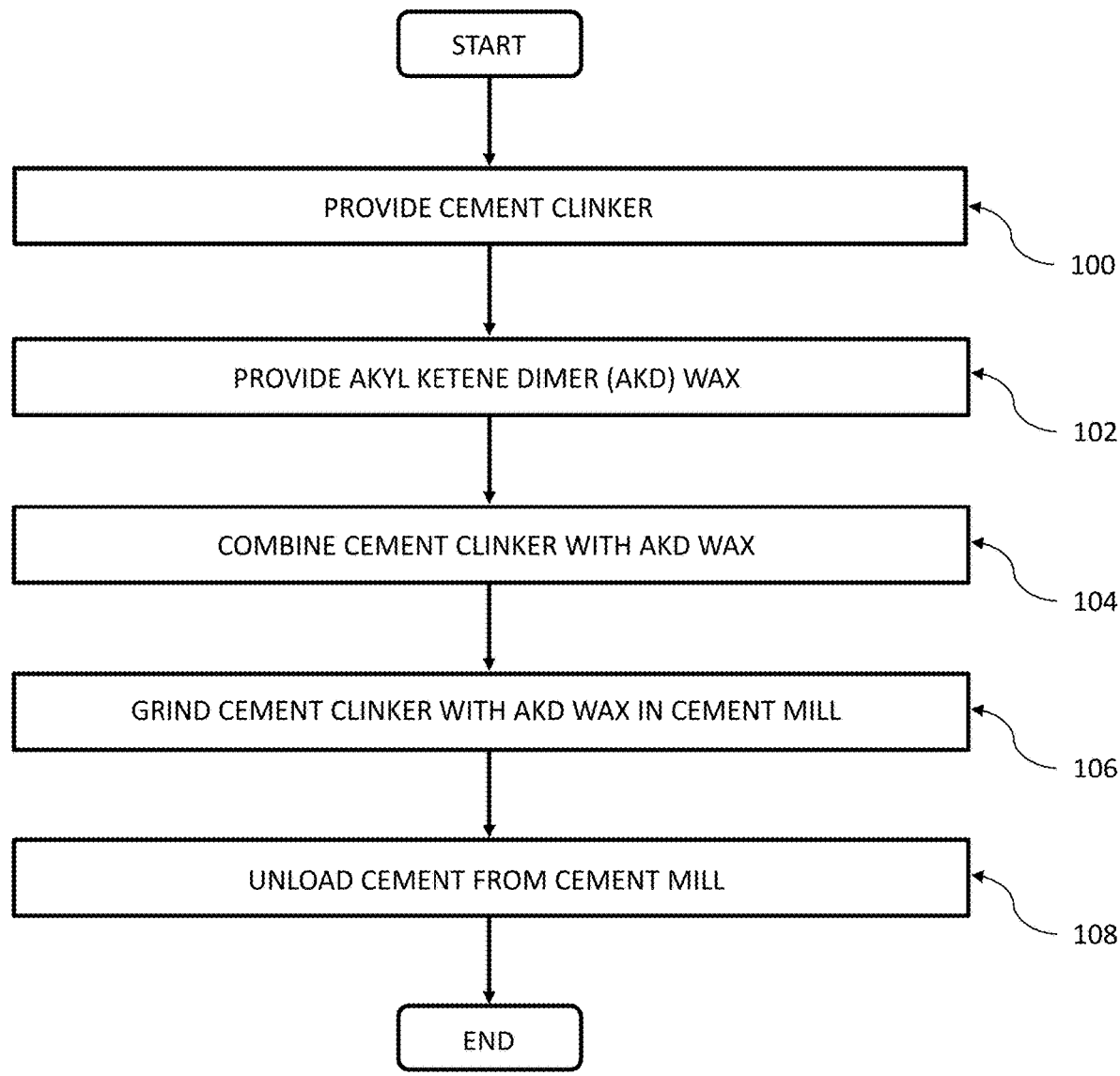
FIG. 1 is a flow chart showing an example process for producing self-protecting cement.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Numerous specific details are set forth below in order to provide a thorough understanding of the subject matter described herein. However, the subject matter described herein may be practiced without these specific details. In other instances, well-known methods, procedures and components have not been described in detail so as to not to obscure the subject matter described herein. Also, the description is not to be considered as limiting the scope of the subject matter described herein.

Various terms used throughout the present description may be read and understood as follows, unless the context indicates otherwise: "Or" as used throughout is inclusive, as though written "and/or". Singular articles and pronouns as used throughout include their plural forms, and vice versa. Similarly, gendered pronouns include their counterpart pronouns so that pronouns should not be understood as limiting anything described herein to use, implementation, performance, etc. by a single gender. "Exemplary" should be understood as "illustrative", "exemplifying" or "serving as an example, instance, or illustration," and not necessarily as "preferred". The terms, "comprises" and "comprising" are to be construed as being inclusive and open ended, and not exclusive. Specifically, when used in this specification including the claims, the terms, "comprises" and "comprising" and variations thereof mean the specified features, steps or components are included. These terms are not to be interpreted to exclude the presence of other features, steps or components. The terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. Further definitions for terms may be set out herein; these may apply to prior and subsequent instances of those terms, as will be understood from a reading of the present description.

Disclosed herein is a process for producing self-protecting cement. The process generally involves grinding a cement precursor (e.g. a Portland cement (alternatively described herein as "PC") precursor such as cement clinker or PC powder) and a wax (i.e. alkyl ketene dimer wax and/or alkenyl ketene dimer wax, optionally combined with paraffin wax). The process can yield a cement that includes cement grains coated with wax.

In some examples, the cement precursor is a PC precursor. The PC precursor can be cement clinker, and the process can involve grinding the cement clinker with the wax in a cement mill. It is believed that this process can increase mill production (e.g. up to about 20%) and improve energy efficiency (e.g. up to about 10%), as the wax serves as a grinding aid, and prevents or minimizes or reduces coating of the grinding balls and walls of the cement mill with cement, as well as prevents or reduces or minimizes aggregation of cement particles during grinding.

In alternative examples, the cement precursor is a pre-ground cement powder such as pre-ground PC powder, and the process involves re-grinding the cement powder with the wax.

In further alternative examples, the cement precursor can be a non-PC precursor, such as a calcium aluminate cement precursor, a calcium sulfoaluminate cement precursor, a geopolymer cement precursor, or a slag lime cement precursor.

The wax can include alkyl ketene dimer wax, alkenyl ketene dimer wax, or a combination thereof, and in this document, the term "AKD wax" can refer to alkyl ketene dimer wax, alkenyl ketene dimer wax, or a combination thereof. In some examples, paraffin wax is combined with the AKD wax. The paraffin can act synergistically with the AKD wax, and may perform a dual function. First, paraffin wax may serve as a bulk filler that facilitates uniform distribution of the AKD wax and facilitates uniform coating of the AKD wax on the cement grains. Second, paraffin wax having a higher molecular weight has less mobility than AKD wax, and unlike the AKD it does not migrate inside the cement grain remaining on the grain surface over time, and being mixed with the AKD it may help to retain AKD wax on the grain surface.

The ketene dimers used in the AKD wax are dimers having the formula: $R(CH=C=O)$, where R is a hydrocarbon radical, such as an alkyl having at least 8 carbon atoms, a cycloalkyl having at least 6 carbon atoms, and aryl, aralkyl, alkaryl, and decyl ketene dimer.

Examples of ketene dimers include octyl, decyl, dodecyl, tetradecyl, hexadecyl, octadecyl, eicosyl, docosyl, tetracosyl, phenyl, benzyl, beta-naphthyl and cyclohexyl ketene dimers, as well as the ketene dimers prepared from montanic acid, naphthenic acid, $\Delta 9,10$-decylenic acid, $\Delta 9,10$-dodecylenic acid, palmitoleic acid, oleic acid, ricinoleic acid, petroselenic acid, vaccenic acid, linolenic acid, and eleostearic acid, gadoleic as well as mixtures of fatty acids that naturally occur from various sources such as coconut oil, babassu oil, palm kernel oil, palm oil, olive oil, peanut oil, rape seed oil, beef tallow, lard, and whale blubber. Mixtures of any of the above named fatty acids may also be used in the preparation of the ketene dimer. Some of such ketene dimers are described in U.S. Pat. No. 4,407,994, and later in U.S. Pat. No. 7,429,309, herein incorporated by references.

It is believed that the processes described herein can yield self-protecting cement (SPC) which is protected to a significant degree from deterioration from contact with atmospheric moisture and from accidental short-term contact with water prior to preparing cement compositions, or, in other words, is substantially hydrophobic. This can allow for long shelf life, for example up to 2 years, even in severe transportation and storage conditions, since the cement is protected from contact with both liquid water and water vapor. Furthermore, it is believed that when the cement is used to make cementitious materials such as mortars and/or concrete (e.g. conventional concrete, high performance concrete, or ultra-high performance concrete), the hardened cementitious materials can also be somewhat hydrophobic, or have reduced water permeability, which can increase the service life of structures made from these cementitious materials.

The self-protecting cement described herein may be protected to a significant degree from deterioration from contact with atmospheric moisture and from accidental short-term contact with water prior to preparing cement compositions.

It has further been determined in examples that the cementitious materials made from the SPC have increased early and ultimate strength compared to cementitious material made from regular PC. In these examples, the mortars and concrete made from fresh SPC have compressive strength (after one day) by between about 30% and about 50% higher than compressive strength (after one day) of the such mortars and concrete made from fresh regular PC, and by between an 10% to 20% higher after 28 days. The mortars and concrete made from SPC stored between 15 months and 18 months have compressive strength (after one day) by between about 250% and about 400% higher than compressive strength (after one day) of the such mortars and concrete made from regular PC after the same storage time, and by between an 40% to 70% higher after 28 days.

The cement precursor and the AKD wax can be combined in a mass ratio of, for example, between about 990:10 and about 999.5:0.5. For example, the mass ratio of PC precursor to AKD wax can be about 999:1, or about 998.5:1.5, or about 998:2.

In examples where paraffin wax is also added, the AKD wax and paraffin wax can be provided in a ratio of between about 1:1 and about 1:4.

Referring now to FIG. 1, a flowchart of an example process for producing self-protecting cement is shown. In the example shown, the cement precursor is PC clinker. At step 100, the cement clinker is provided. The cement clinker can be a nodular material produced in the kilning stage during the production of cement. The cement clinker can have, for example, lumps having a diameter of between about 3 mm and about 25 mm.

At step 102, the wax is provided. The wax may be a non-aqueous (i.e. it is not in the form of an aqueous emulsion) AKD wax. In the example shown, the AKD wax is provided as a solid in the form of pellets (also known as flakes or prills). In some examples, the pellets have a diameter of between about 3 mm and about 6 mm, and a thickness of between about 1 mm and about 2 mm. In some particular examples, the AKD wax is alkyl ketene dimer wax sold under the brand name Aquapel®, for example Aquapel® 364 or Aquapel® 364K. In other examples, the AKD wax can be alkenyl ketene dimer wax, and/or can be provided as a liquid. In some example paraffin wax is provided together with the AKD wax, as a solid in the form of granules.

At step 104, the cement clinker and wax are combined so that the wax pellets (in some examples with the addition of paraffin wax) mix with the cement clinker granules, and at step 106, the cement clinker and the wax are ground in a cement mill to yield PC grains coated with wax. Optionally, the cement clinker and the wax are combined before being fed into the cement mill. Alternatively, the cement clinker and the wax can be combined in the cement mill, either prior to or concurrently with grinding.

The cement mill can be, for example, a ball mill, a roller mill, an attritor, or another type of mill that can reduce clinker to powder.

Figure 2A:
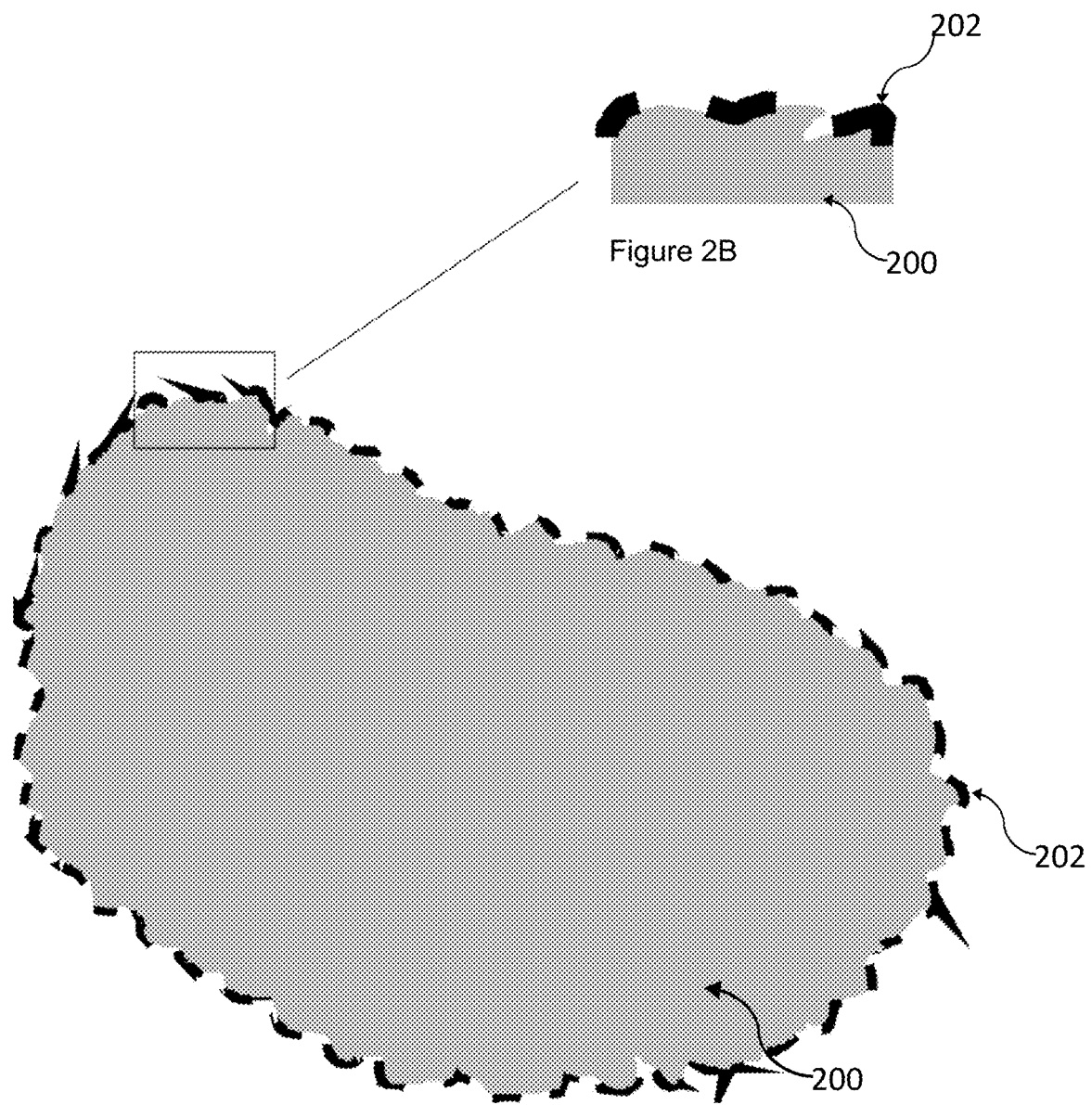
FIG. 2A is a schematic drawing of Portland cement grains coated with AKD wax.

Referring to FIGS. 2A and 2B, during grinding (otherwise known as comminution), the cement clinker is reduced to fine grains 200, and the wax pellets melt and create a coating 202 on the cement grains 200. For example, the temperature in the cement mill can be between about 70° C. and about 110° C., and a typical melting temperature of AKD wax and paraffin wax can be between about 45° C. and about 70° C. The coating 202 can be relatively thin, and can be discontinuous (e.g. having a mesh structure) or continuous.

At step 108, the product of step 106—i.e. cement that is made up of PC powder grains with a coating of the wax thereon—is unloaded from the cement mill. The cement can then be cooled, so that the wax solidifies around the PC powder grains and bonds the cement particles together in groups of several particles (micro-granulation of the cement).

The cement can then optionally be stored and/or transported, optionally with an additional storage step after transportation. The cement can then be used to make a cementitious material such as mortar or concrete. For example, the cement can be dry-mixed with mortar components such as sand and silica and other additives and then be combined with water allowed to set, or can be combined with water and concrete components such as sand and aggregates and other additives and then be allowed to set to yield concrete.

Figure 3:
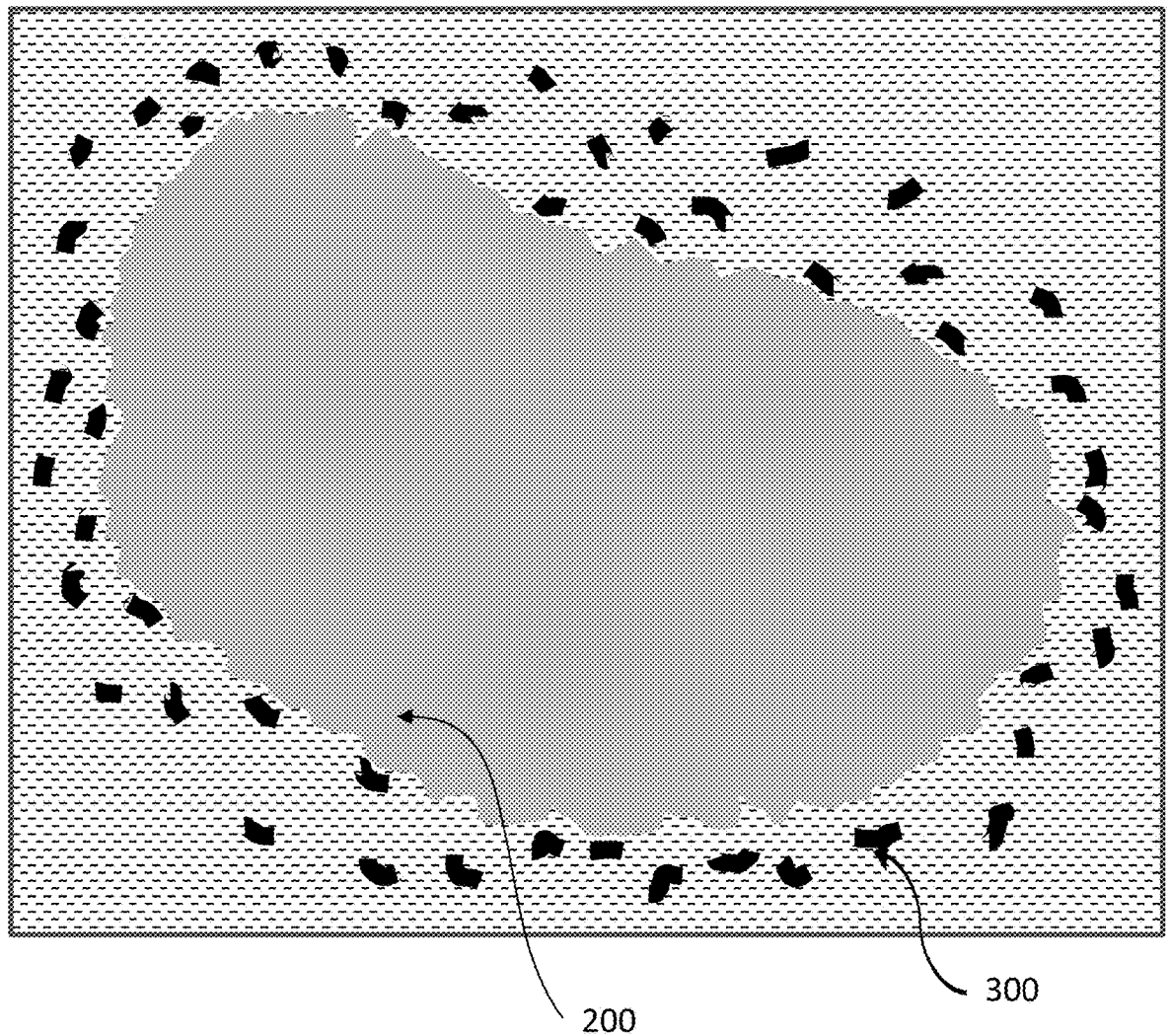
FIG. 3 is a schematic drawing of AKD particles that have been detached from a Portland cement grain during mixing with water.

Without being limited by theory, it is believed as follows: During mixing of the cement with water and with other components, the wax coating is removed from the surface of the cement grains (e.g. due to mechanical forces). The wax then takes a form of micro-particles 300 suspended in water and surrounding the cement grains 200, as shown in FIG. 3. The wax micro-particles surrounding the cement grains promote, above and beyond natural affinity of water to cement, an additional ingression of water into the cement grains, which in turn facilitates accelerated and more complete hydration of the cement grains, thus increasing early and ultimate strength of the cementitious material.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

Examples

The following examples are exemplary in nature and are not to be construed as promises as to the effectiveness of the claimed invention.

A first example compares compressive strength of conventional concrete made with PC vs compressive strength of a similar concrete made with SPC after various periods of the cement's storage periods under artificial acceleration conditions.

Portland cement powder (CRH Canada, Type HE) and pellets of alkyl ketene dimer wax (Aquapel® 364K from Solenis LLC) were combined and ground in a lab scale ball mill (i.e. an attritor). The Portland cement powder and alkyl ketene dimer wax were combined in mass ratios of between 999:1 and 998:2. As a control, Portland cement powder alone (without wax) was ground in the ball mill in the same mode.

After grinding, samples were collected, comprising 16 samples of the Portland cement with no wax—regular Portland cement (PC) and 16 samples of the Portland cement powder combined with wax—Self-Protecting Cement (SPC). Four samples of the PC and four samples the SPC were then used immediately after grinding (0 storage days) to form conventional concrete, which was then molded into cubes. The compressive strength of the cubes was then tested 1 day after molding, 7 days after molding, 28 days after molding, and 90 days after molding.

Another 12 samples of the PC and 12 samples of the SPC were placed into a chamber for storage under artificial accelerating aging conditions: temperature about 40° C. and relative humidity close to 100%. Out of these 24 samples, four samples of the PC and four samples of the SPC were stored in the chamber for 30 days, another four samples of the PC and four samples of the SPC were stored in the chamber for 75 days, and another four samples of the PC and four samples of the SPC were stored in the chamber for 90 days.

At the end of the above mentioned storage periods the samples of the PC and the SPC were used to form conventional concrete, which was then molded into cubes. The compressive strength of all the cubes was then tested 1 day after molding, 7 days after molding, 28 days after molding, and 90 days after molding.

The list of materials used in forming the conventional concrete are shown in table 1. The mix design of the conventional concrete is shown in Table 2.

TABLE 1

| Item | Type |
| --- | --- |
| Cement | PC - Portland cement (CRH Canada, Type HE) SPC - Portland cement (CRH Canada, Type HE) + AKD wax Aquapel ™ 364K, 0.15% |
| Fine aggregate | Sand Fairmount Santrol LS-80 |
| Coarse aggregates | Limestone, size 1-3 mm Limestone, size 3-5 mm Limestone, size 5-8 mm |
| Superplasticizer | ADVA Cast 575 |
| Water | City of Toronto |

TABLE 2

| Material | Weight, kg/m³ |
| --- | --- |
| Cement | 432 |
| Sand | 864 |
| Limestone, size 1-3 mm | 259 |
| Limestone, size 3-5 mm | 519 |
| Limestone, size 5-8 mm | 519 |
| Superplasticizer | 10 |
| Water | 169 |

Figure 4A:
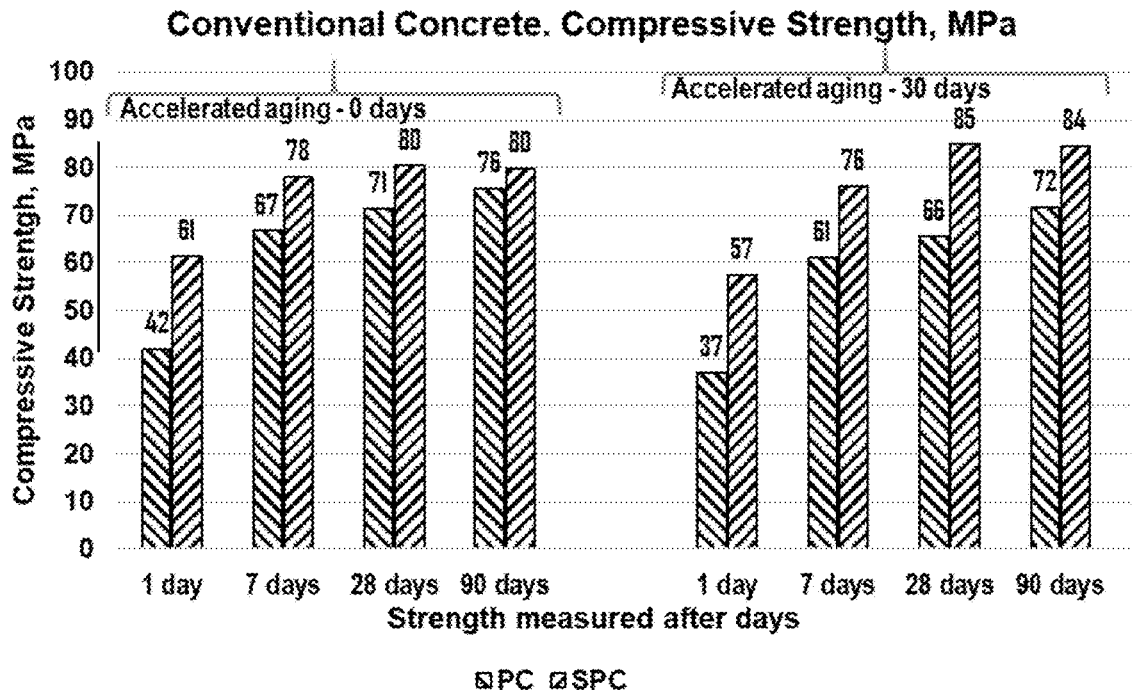
FIGS. 4A and 4B are bar graphs of compressive strength data for conventional concrete.
Figure 4B:
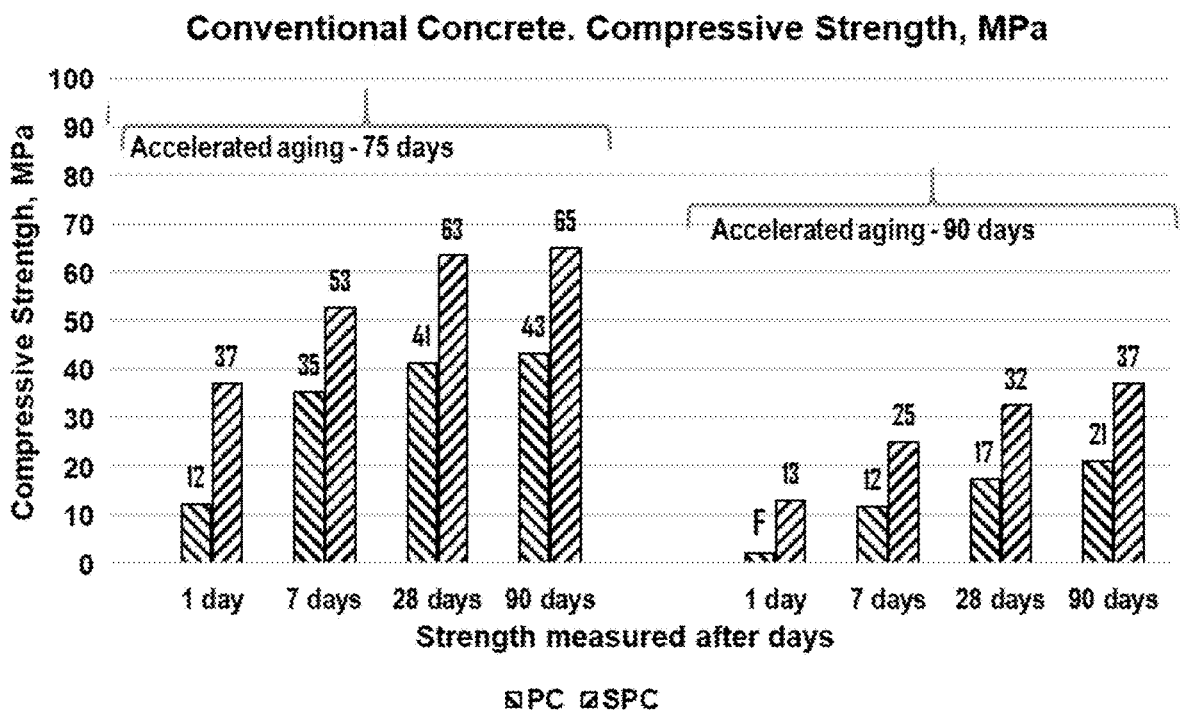

The compressive strength of conventional concrete made with PC was compared with the compressive strength of conventional concrete made with SPC as shown in Table 3 and plotted graphically in FIGS. 4A and 4B. The compressive strength was tested after various storage periods under artificial accelerated aging conditions as shown.

TABLE 3

| | | Cement/Compressive Strength, MPa | | |
| --- | --- | --- | --- | --- |
| Storage Days | Strength After Days | PC | SPC | Strength Increase, % |
| 0 | 1 day | 41.93 | 61.31 | 46% |
| 0 | 7 days | 66.80 | 78.16 | 17% |
| 0 | 28 days | 71.40 | 80.44 | 13% |
| 0 | 90 days | 75.69 | 79.85 | 5% |
| 30 | 1 day | 36.96 | 57.48 | 56% |
| 30 | 7 days | 61.06 | 76.05 | 25% |
| 30 | 28 days | 65.64 | 84.90 | 29% |
| 30 | 90 days | 71.74 | 84.44 | 18% |
| 75 | 1 day | 12.24 | 37.02 | 202% |
| 75 | 7 days | 35.28 | 52.72 | 49% |
| 75 | 28 days | 41.28 | 63.48 | 54% |
| 75 | 90 days | 43.17 | 65.12 | 51% |
| 90 | 1 day | 2.00 | 12.90 | 545% |
| 90 | 7 days | 11.75 | 24.93 | 112% |
| 90 | 28 days | 17.27 | 32.49 | 88% |
| 90 | 90 days | 20.96 | 36.93 | 76% |

The testing results for conventional concrete suggest the following:

Compressive strength of the conventional concrete made with use of fresh SPC and measured after one day of curing is about 45% higher than compressive strength of the same concrete made with use of fresh PC and measured one day after curing.

Compressive strength of the conventional concrete made with use of fresh SPC and measured after 7 and 28 days of curing is about 15% higher than compressive strength of the same concrete made with use of fresh PC and measured accordingly after 7 and 28 days of curing.

Compressive strength of the conventional concrete made with use of fresh SPC and measured after 90 days of curing is about 5% higher than compressive strength of the same concrete made with use of fresh PC and measured accordingly after 90 days of curing.

Compressive strength of the conventional concrete made with use of SPC stored under accelerating aging conditions for 30 days (corresponds to about six months of storage in closed bags in normal storage conditions) and measured after one day of curing after molding is about 55% higher than compressive strength of the same concrete made with use of PC stored under the same accelerating aging conditions for 30 days and measured one day of curing after molding.

Compressive strength of the conventional concrete made with use of SPC stored under accelerating aging conditions for 30 days (corresponds to about six months of storage in closed bags in normal storage conditions) and measured after 7, 28, and 90 days of curing after molding is between about 20% and 30% higher than compressive strength of the same concrete made with use of PC stored under the same accelerating aging conditions for 30 days and measured after the same corresponding periods.

Compressive strength of the conventional concrete made with use of SPC stored under accelerating aging conditions for 75 days (corresponds to about 15-18 months of storage in closed bags in normal storage conditions) and measured after one day of curing after molding is about 200% higher than compressive strength of the same concrete made with use of PC stored under the same accelerating aging conditions for 75 days and measured one day of curing after molding.

Compressive strength of the conventional concrete made with use of SPC stored under accelerating aging conditions for 75 days (corresponds to about 15-18 months of storage in closed bags in normal storage conditions) and measured after 7, 28, and 90 days of curing is about 50% higher than compressive strength of the same concrete made with use of PC stored under the same accelerating aging conditions for 75 days and measured after the same corresponding periods.

Compressive strength of the conventional concrete made with use of SPC stored under accelerating aging conditions for 90 days (corresponds to about 18-24 months of storage in closed bags in normal storage conditions) and measured after one day of curing is above 500% higher than compressive strength of the same concrete made with use of PC stored under the same accelerating aging conditions for 90 days and measured one day of curing after molding.

Compressive strength of the conventional concrete made with use of SPC stored under accelerating aging conditions for 90 days (corresponds to about 18-24 months of storage in closed bags in normal storage conditions) and measured after 7, 28, and 90 days of curing is about between 80% and 110% higher than compressive strength of the same concrete made with use of PC stored under the same accelerating aging conditions for 90 days and measured after the same corresponding periods.

A second example compares the compressive strength of ultra high performance concrete (UHPC) made with SC was compared with the compressive strength of UHPC made with SPC. The compressive strength was tested after various storage periods of the UHPC dry compositions under artificial acceleration conditions.

Portland cement (CRH Canada, Type HE) and pellets of alkyl ketene dimer wax (Aquapel™ 364K from Solenis LLC) were combined and ground in a lab scale ball mill (i.e. an attritor). The Portland cement powder and alkyl ketene dimer wax were combined in mass ratios of between 999:1 and 998:2. As a control, Portland cement powder alone with no wax was ground in the ball mill in the same mode. Two types of dry UHPC compositions of the same mix design were composed; one composition including PC and another—SPC. The list of the materials used for formation of the dry UHPC compositions is in the Table 4. The mix design of the UHPC is listed in Table 5.

TABLE 4

| Item | Type |
| --- | --- |
| Cement | PC - Portland cement (CRH Canada, Type HE) |
|  | SPC - Portland cement (CRH Canada, Type HE) + AKD wax Aquapel ™ 364K, 0.15% |
| Silica Fume | Elkem 955U |
| Quartz | Min-U-Sil-30 |
| Fine Aggregates | Sand Fairmount Santrol LS-80 Bauxite, size 0-1 mm |
| Superplasticizer | Supercizer PCE |
| Metal Fibers | Dramix OL 6/.16 |

TABLE 5

| Material | Weight, kg/m³ |
| --- | --- |
| Cement | 982 |
| Sand | 196 |
| Bauxite | 589 |
| Quartz | 98 |
| Silica Fume | 226 |
| Fibers | 236 |
| Superplasticizer | 18 |
| Water | 278 |

After forming the dry UHPC compositions, there were taken the following samples: 12 samples of the UHPC dry composition with PC (UHPC/PC) dry composition and 12 samples of the UHPC composition with SPC (UHPC/SCP) dry composition. Three samples of the UHPC/PC and three samples of the UHPC/SCP were then used immediately after UHPC forming (0 storage days) to make Ultra High Performance Concrete (UHPC), which was then molded into cubes. The compressive strength of the cubes was then tested 1 day after molding, 7 days after molding, and 28 days after molding.

Another 9 samples of the UHPC/PC dry composition and 9 samples of the UHPC/SPC dry composition were placed into a chamber for storage under artificial accelerating aging conditions: temperature about 40° C. and relative humidity close to 100%. Out of these 18 samples, three samples of the UHPC/PC dry composition and three samples of the UHPC/SPC dry composition were stored in the chamber for 30 days, another three samples of the UHPC/PC dry composition and three samples of the UHPC/SPC dry composition were stored in the chamber for 75 days, and another three samples of the UHPC/PC dry composition and three samples of the UHPC/SPC dry composition were stored in the chamber for 90 days.

At the end of the above mentioned storage periods the samples of the UHPC/PC dry composition and the UHPC/SPC dry composition were used to form UHPC, which was then molded into cubes. The compressive strength of all the cubes was then tested 1 day after molding, 7 days after molding, and 28 days after molding.

Figure 5A:
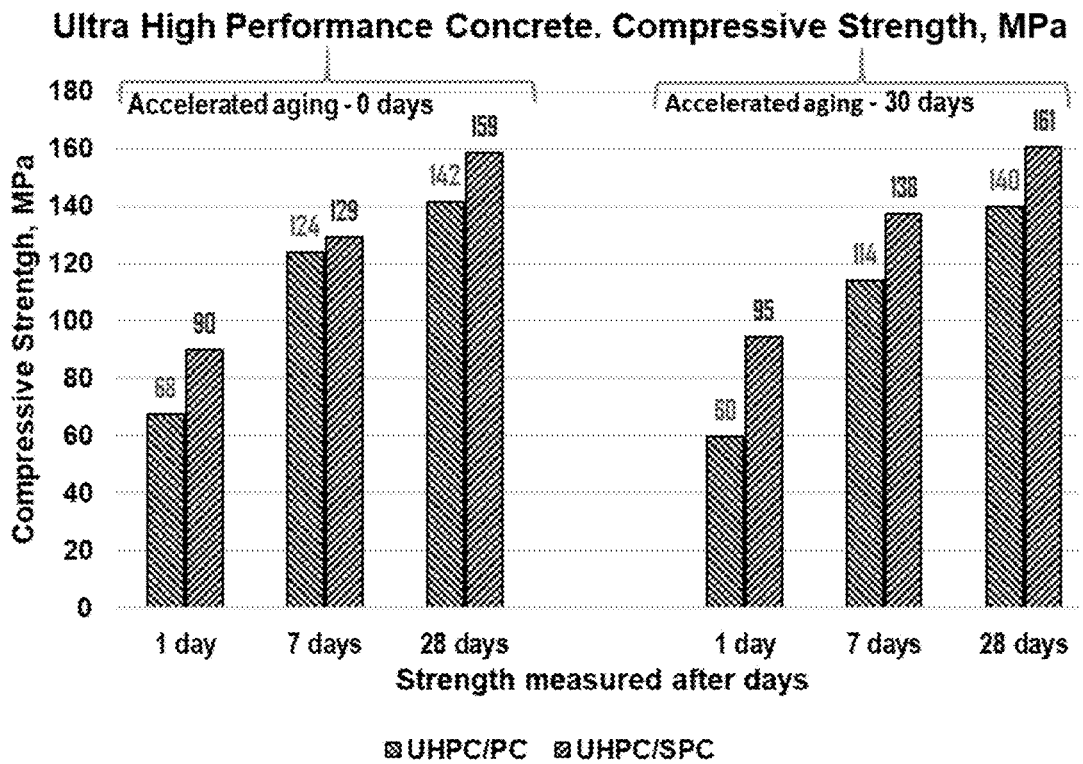
FIGS. 5A and 5B are bar graphs of compressive strength of ultra high performance concrete.
Figure 5B:
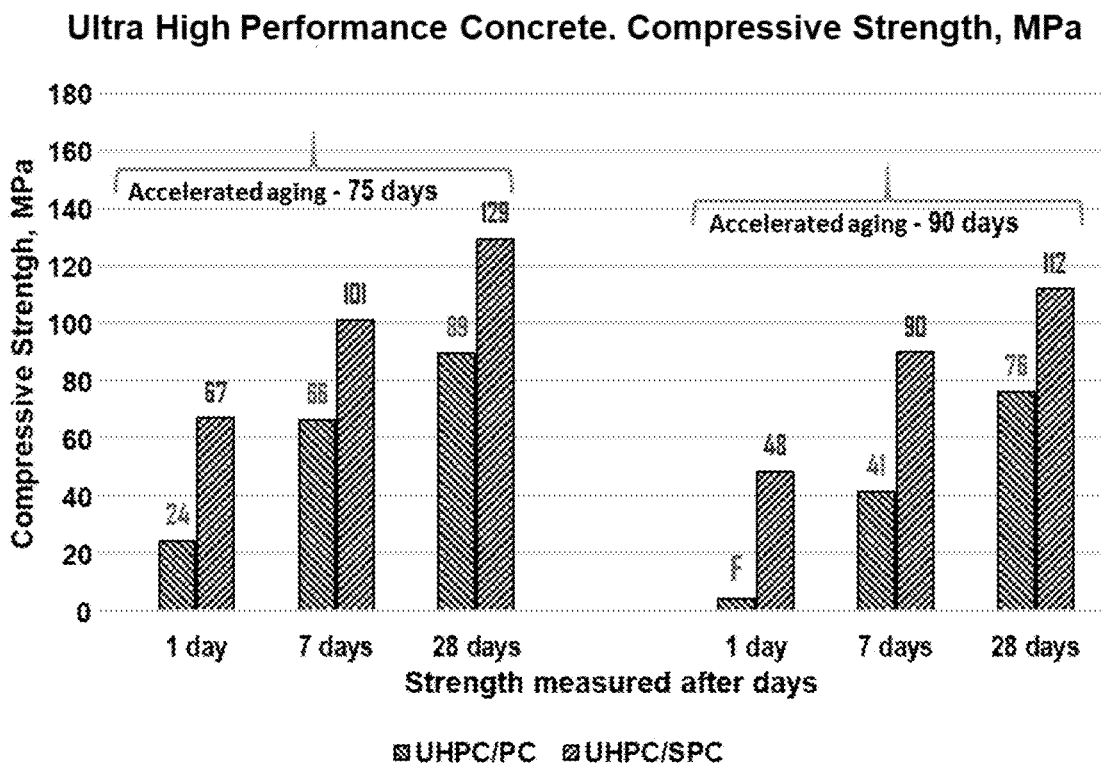

Results of the compressive strength tests of the UHPC samples made from the UHPC/PC and UHPC/SPC dry compositions after various storage periods under the artificial accelerating aging conditions are shown in the Table 6 and plotted graphically in FIGS. 5A and 5B.

TABLE 6

| | | Cement Type/Compressive Strength, MPa | | |
| --- | --- | --- | --- | --- |
| Storage Days | Strength After Days | PC | SPC | Strength Increase, % |
| 0 days | 1 day | 67.69 | 89.99 | 33% |
| 0 days | 7 days | 124.02 | 129.23 | 4% |
| 0 days | 28 days | 141.59 | 158.56 | 12% |
| 30 days | 1 day | 59.58 | 94.58 | 58% |
| 30 days | 7 days | 113.99 | 137.59 | 21% |
| 30 days | 28 days | 139.95 | 160.64 | 15% |
| 75 days | 1 day | 24.28 | 69.94 | 176% |
| 75 days | 7 days | 66.36 | 101.09 | 52% |
| 75 days | 28 days | 89.45 | 129.12 | 44% |
| 90 days | 1 day | 4.00 | 48.28 | 1107% |
| 90 days | 7 days | 41.29 | 89.83 | 118% |
| 90 days | 28 days | 76.26 | 111.88 | 47% |

The testing results for UHPC suggest the following:

Compressive strength of the UHPC made from fresh UHPC/SPC composition and measured after one day of curing is about 30% higher than compressive strength of the same concrete made with use of fresh UHPC/PC composition and measured one day after curing.

Compressive strength of the UHPC made from fresh UHPC/SPC composition and measured after 7 and 28 days of curing is between about 5% and 10% higher than compressive strength of the same concrete made from fresh UHPC/PC composition and measured accordingly after 7 and 28 days of curing.

Compressive strength of the UHPC made from UHPC/SPC composition stored under accelerating aging conditions for 30 days (corresponds to about six months of storage in closed bags in normal storage conditions) and measured after one day of curing after molding is about 55% higher than compressive strength of the same concrete made from UHPC/PC composition stored under the same accelerating aging conditions for 30 days and measured one day of curing after molding.

Compressive strength of the UHPC made from UHPC/SPC composition stored under accelerating aging conditions for 30 days (corresponds to about six months of storage in closed bags in normal storage conditions) and measured after 7 and 28 days of curing after molding is between about 15% and 20% higher than compressive strength of the same concrete made from UHPC/PC composition stored under the same accelerating aging conditions for 30 days and measured after the same corresponding periods.

Compressive strength of the UHPC made from UHPC/SPC composition stored under accelerating aging conditions for 75 days (corresponds to about 15-18 months of storage in closed bags in normal storage conditions) and measured after one day of curing after molding is about 175% higher than compressive strength of the same concrete made from UHPC/PC composition stored under the same accelerating aging conditions for 75 days and measured one day of curing after molding.

Compressive strength of the UHPC made from UHPC/SPC composition stored under accelerating aging conditions for 75 days (corresponds to about 15-18 months of storage in closed bags in normal storage conditions) and measured after 7 and 28 days of curing is about 40-50% higher than compressive strength of the same concrete made from UHPC/PC composition stored under the same accelerating aging conditions for 75 days and measured after the same corresponding periods.

Compressive strength of the UHPC made from UHPC/SPC composition stored under accelerating aging conditions for 90 days (corresponds to about 18-24 months of storage in closed bags in normal storage conditions) and measured after one day of curing is above 1000% higher than compressive strength of the same concrete made from UHPC/PC composition stored under the same accelerating aging conditions for 90 days and measured one day of curing after molding.

Compressive strength of the UHPC made from UHPC/SPC composition stored under accelerating aging conditions for 90 days (corresponds to about 18-24 months of storage in closed bags in normal storage conditions) and measured after 7 and 28 days of curing is about between 50% and 110% higher than compressive strength of the same concrete made from UHPC/PC composition stored under the same accelerating aging conditions for 90 days and measured after the same corresponding periods.

A third example compares water sorptivity of conventional concrete made with use of PC vs water sorptivity of the same mix design concrete made with use of SPC.

Figure 6A:
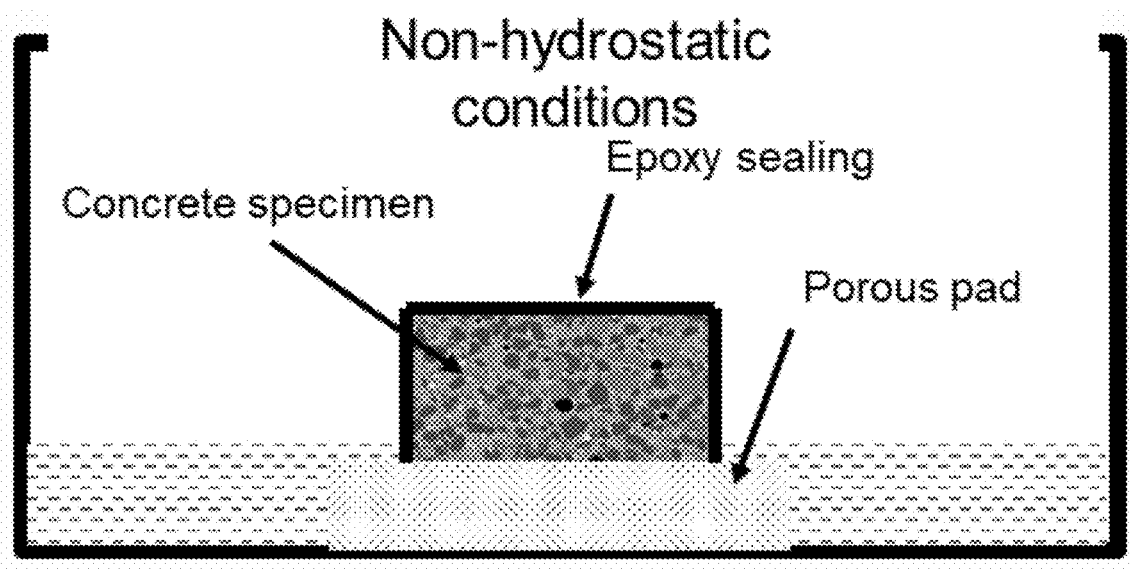
FIGS. 6A and 6B are schematic drawings of non-hydrostatic and hydrostatic environments for the graphs of FIGS. 7A and 7B.
Figure 6B:
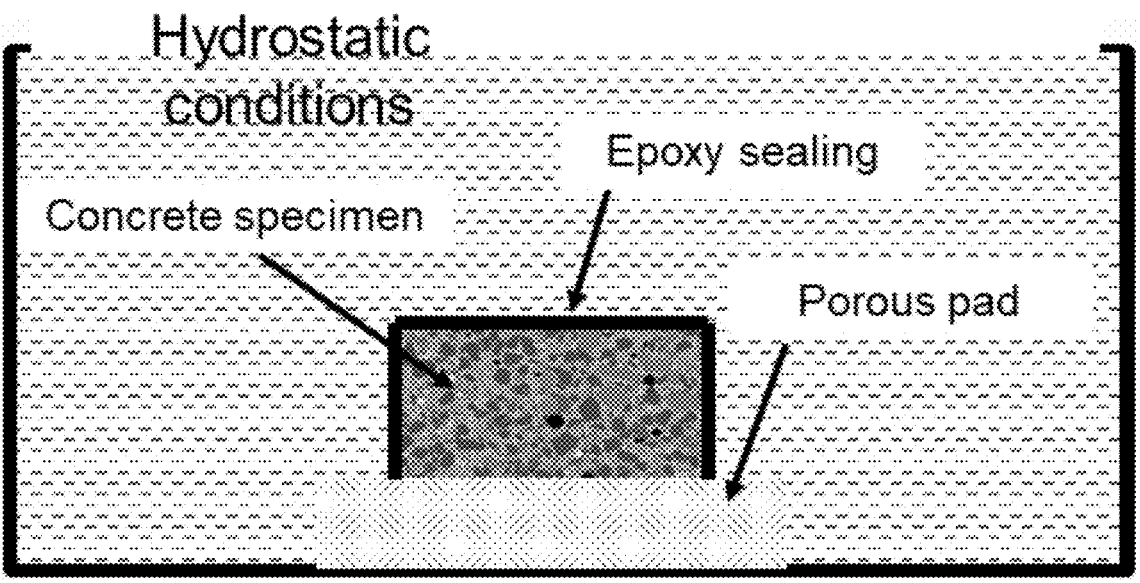
Figure 7A:
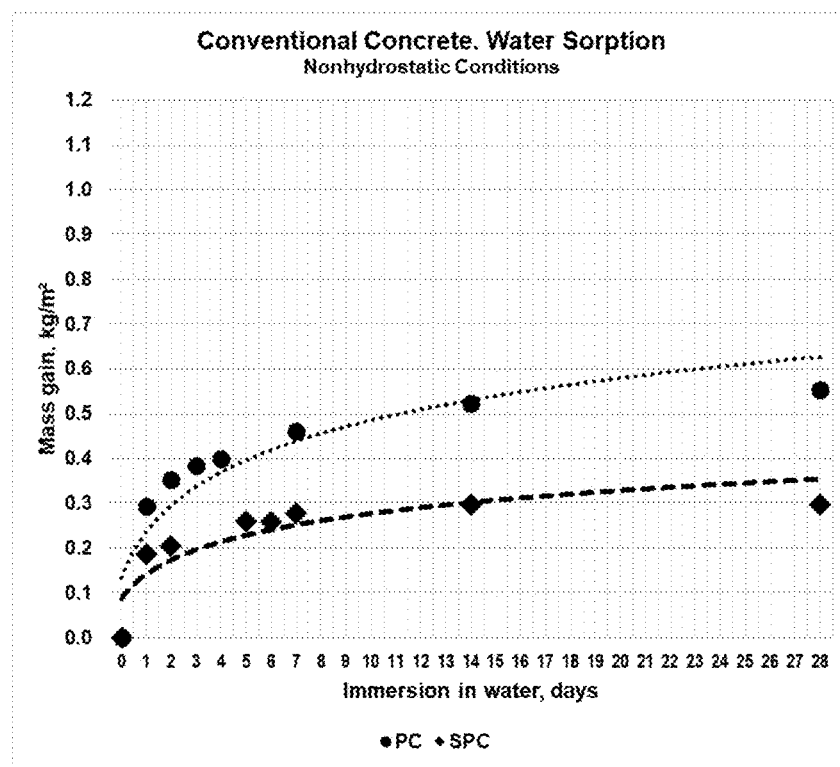
FIGS. 7A and 7B are interpolated line graphs of water sorption of conventional concrete and UHPC.
Figure 7B:
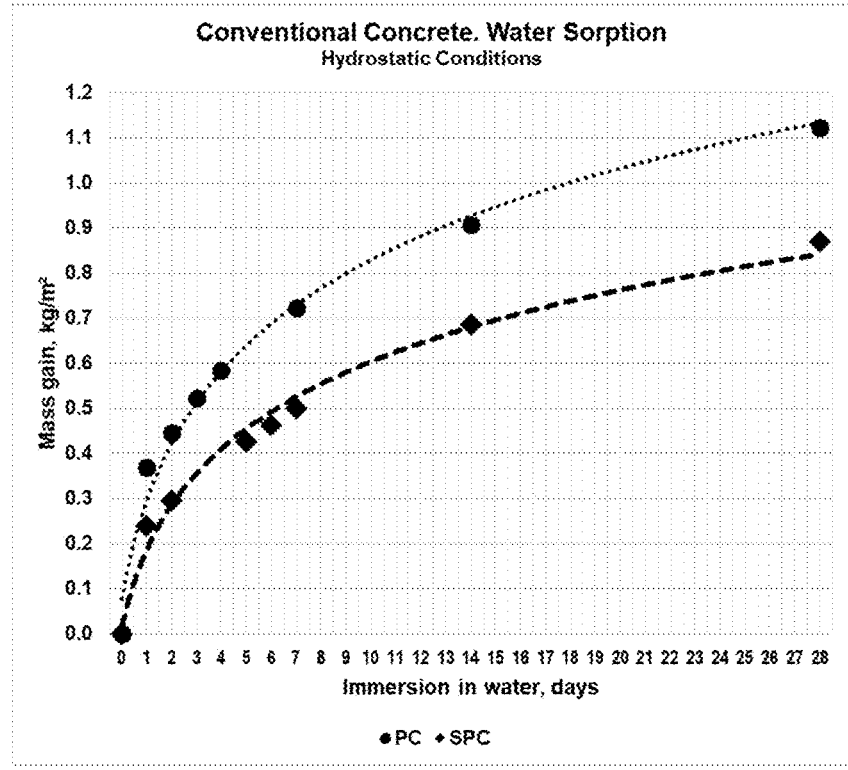

Concrete compositions were formed with PC and SPC using the components shown in the Table 1 and according to the mix design indicated in the Table 2., and poured into cylinder molds with diameter 100 mm. There were produced accordingly four cylinders with diameter 100 mm and height 100 mm made from concrete with PC and four cylinders of the same size made from concrete with SPC. All of the cylinders were cured under the same room conditions (temperature T=20° C.±2° C. and relative humidity RH~50%) for 28 days. After this the cylinders were split in two equal halves along the central vertical axis, and the lateral surfaces of the cylinders and their bases were sealed with epoxy. The split surfaces were not coated with epoxy. Then the split halves were placed into water for measuring water sorptivity by the split surfaces under non-hydrostatic and hydrostatic conditions. The layout of the concrete samples in water is shown in the FIGS. 6A and 6B. The original weight of the samples was measure and then the samples were taken repeatedly out water after certain time periods, wiped and their weight was measured to determined amount of water absorbed by the concrete samples. The water sorptivity of the concrete made from PC and SPC, expressed in mass gain, is shown in Table 7 and plotted graphically in FIGS. 7A and 7B.

TABLE 7

| Product/Conditions N, H | Immersion in Water, days (after 28 days of concrete curing)/Mass Gain, kg/m² | | | | | | | | | |
|---|---|---|---|---|---|---|---|---|---|---|
| | 0 | 1 | 2 | 3 | 4 | 5 | 6 | 7 | 14 | 28 |
| Concrete from PC | | | | | | | | | | |
| Nonhydrostatic conditions | 0 | 0.2923 | 0.3538 | 0.3846 | 0.4000 | | | 0.4615 | 0.5231 | 0.5538 |
| Hydrostatic conditions | 0 | 0.3692 | 0.4462 | 0.5231 | 0.5846 | | | 0.7231 | 0.9077 | 1.1231 |
| Concrete from SPC | | | | | | | | | | |
| Nonhydrostatic conditions | 0 | 0.1852 | 0.2037 | | | 0.2593 | 0.2593 | 0.2778 | 0.2963 | 0.2963 |
| Hydrostatic conditions | 0 | 0.2407 | 0.2963 | | | 0.4259 | 0.4630 | 0.5000 | 0.6852 | 0.8704 |

It is demonstrated by the test results plotted that the SPC concrete absorbs by about 50-80% less water than the PC concrete in non-hydrostatic conditions, and by about 30-40% less water than the PC concrete in hydrostatic conditions. Lower water permeability of the SPC concrete means its higher durability compared to regular PC concrete.

It was observed that use of the AKD wax in combination with paraffin wax gives results similar to those mentioned in the examples above.

Furthermore, it was observed that during grinding of the Portland cement powder with AKD wax in combination with paraffin wax, a reduction in dusting occurred. It is believed that this because during grinding, a micro-granulation or micro-aggregation process occurs, in which the cement grains aggregate together due to the binding ability of the wax and the ability of the wax to be liquefied and to coat cement grains during heating in the cement grinding process, and subsequent hardening of the wax coating layer around cement grains, which fastens several cement particles in groups to yield micro-grains.

We claim:

1. A self-protecting cement comprising:
cement powder grains; and
a coating of wax on the cement powder grains, wherein the wax is provided as a solid and ground with the cement powder grains to form the coating, and the wax comprises alkyl ketene dimer wax and/or alkenyl ketene dimer wax and paraffin.

2. The self-protecting cement of claim 1, wherein the cement powder grains comprise Portland cement powder grains.

3. The self-protecting cement of claim 1, wherein the coating is discontinuous or continuous on the cement powder grains.

4. The self-protecting cement of claim 1, wherein the cement comprises between 99.5 mass % and 99.95 mass % cement powder grains, and between 0.5 mass % and 0.05 mass % wax.

* * * * *